Patented Oct. 22, 1940

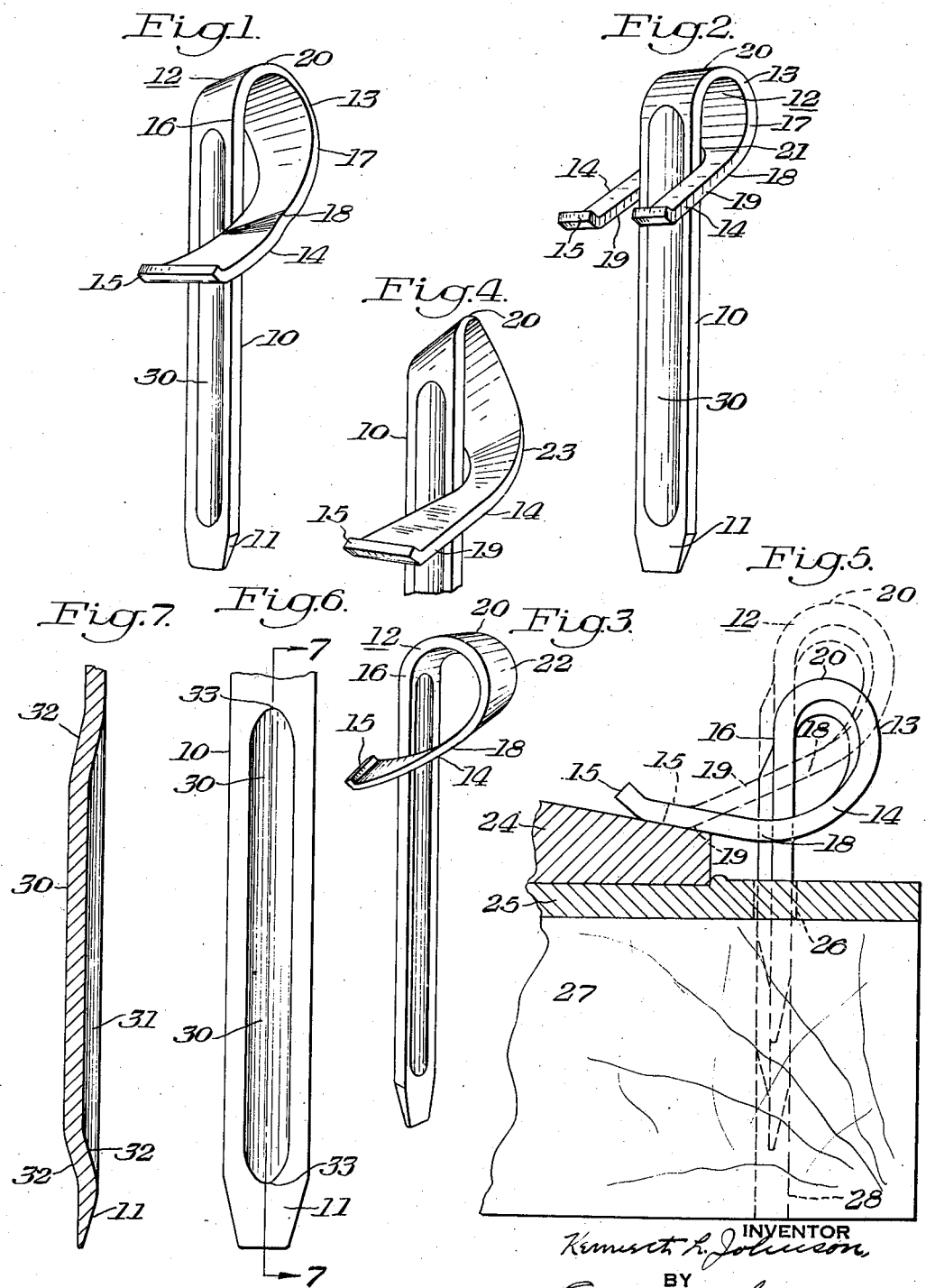

2,218,753

UNITED STATES PATENT OFFICE 2,218,753

FASTENER

Kenneth L. Johnson, Sewickley, Pa.

Application December 23, 1939, Serial No. 310,725

3 Claims. (Cl. 85—19)

This invention relates generally to fastenings and more particularly to fastenings designed to be driven into one member by repeated blows and having a spring head or clamp arranged to engage and secure another member thereto.

This invention may be applied to railway surface tracks for securing railroad rails, plates and track castings on supporting crossties. Again, these fastenings may be used in fabricating wood or metal structures as substitutes for nails, bolts, and the like. The fasteners may be employed in machines for permitting relative movement between two members after a predetermined limit of pressure is applied to one member.

Resilient fastenings of this character known in the art usually consist of a shank portion and an integral head portion having a resilient engaging member. In a few instances these fastenings may be driven into a member, laterally displacing the material by force. In structures of this character the head is either formed on the top of the shank or it overlies the end of the shank, providing continuous engagement therewith to permit the application of the direct driving forces. Ordinarily the shank portion of these fasteners is similar to that of a spike. The resilient engaging member of these fasteners is integral with the shanks at an angle which is usually substantially ninety degrees. Such a structure is undesirable. When the fasteners are applied the resilient holding forces are concentrated at these angular bends, producing a weakened structure.

If the fastener is made of lighter material a socket or hole is provided in the anchoring member for receiving the shank. The shanks of some of these fasteners are split and others are doubled back in U-shaped form. Both of these forms are arranged to expand in the socket to secure them in place. This type of fastener is difficult to remove and frequently that portion of the shank which is directly connected to the head will become distorted if the socket or hole into which the shank is driven is too small in diameter.

Another class of resilient fastener is made from a spring metal band of rectangular cross section which is doubled on itself to produce two parallel strands forming a straight shank; and a resilient head is provided by bending both strands to one side with the outer end of the strands forming the resilient engaging or gripping leg. In some instances the strands forming the head are bent laterally from the plane of the shank while others are turned or twisted at an angle thereto. This type of double leaf structure is difficult to drive or withdraw. Another type of resilient head is formed by bending the strap back from the shank, then up and forward in the form of a U with its free end extending past the shank and slightly downwardly.

In either of these two structures the cross section of the stock is constant throughout its length. It was believed that the clamping leg of each of these structures would flex along its length. However, this is not true, because the shank and clamping leg, being of like cross section, have equal strength to resist bending throughout their lengths, causing any flexure to occur at the point of greatest bending moment. In some existing types of fasteners this flexure occurs in the shank adjacent to the point where the shank enters the anchoring member, this being the point of maximum bending moment. In other types the flexure is concentrated at a point adjacent to the juncture of the shank and the resilient head.

In the present art the entire fastener is made of stock heavy enough to resist a predetermined bending stress at the point of maximum bending moment, which results in an extremely high load per unit deflection of the clamping leg. Such a structure is much heavier than would be necessary if the bending stress were resisted by uniformly distributed flexure of the clamping leg and head.

The clamping pressure applied by the type of fasteners referred to above opens up the head or loop by stretching the inner fibers and compressing the outer fibers of the stock adjacent the point of maximum bending moment. In opening up the head or loop the load per unit deflection is greater than that required to close the head or loop due to the fact that the inside fibers of the stock are shorter than the outside fibers of the stock, both having the same physical properties. When the fibers on the outside of the head or loop are stretched in closing the loop they will permit a greater total resilient elongation around the pivotal point than if the inside fibers were stretched in opening the loop. Thus the opening of the loop produces a greater fiber stress or total load per unit deflection.

The high load per unit deflection permits only a very slight movement of the clamping leg without the bending stress exceeding the elastic limit of the material at the point of concentrated stress. Thus the fastener is only resilient within the elastic limits of the material at the point of maximum bending moments and any excess vibration of the fastened object against the static load applied by the clamping leg causing permanent deformation of the fastener would result in the destruction of its holding power.

These head structures make it difficult to drive and remove the fasteners and to maintain a predetermined heavy load under pressure. They are also difficult and expensive to manufacture.

The principal object of this invention is the provision of a fastener which is improved in structure to overcome these disadvantages.

Another object is the provision of a fastener having a rigid shank section integrally connected to a resilient head section having a clamping leg, the head being flexible throughout its length to avoid stress concentration at any point.

Another object is the provision of a fastener having a relatively low load per unit deflection and capable of withstanding a relatively high peak load applied under vibration without exceeding the elastic limit of the material.

Another object is the provision of a fastener having a clamping leg shaped or formed to fit the contour of the fastened object.

Another object is the provision of a simplified fastener made in one piece and which is economical to manufacture.

Another object is the provision of a fastener having a rigid shank made from stock of relatively small thickness in comparison to its width and reenforced against bending by providing the shank with a longitudinal stiffening rib preferably formed by pressing the intermediate portion longitudinally thereof to produce a flute on one side and a rib on the other side.

Another object is the provision of a fastener having a reenforced shank and a resilient head.

Another object is the provision of a method of forming a rigid shank by pressing the intermediate portion of the shank longitudinally thereof to form a flute on one side and a rib on the other side and tapering the extremities of the flute and rib to an apex at each end thereof.

Other objects and advantages appear in the following description and claims.

In the accompanying drawing a practical embodiment illustrating the principles of this invention is shown wherein:

Fig. 1 is a perspective view of the fastener comprising this invention.

Fig. 2 is a perspective view of a modification of the fastener.

Fig. 3 is a perspective view of a fastener having a tapered resilient engaging leg.

Fig. 4 is a perspective view of a fastener with the loop of the resilient head closed.

Fig. 5 is a sectional view showing the shank of a fastener driven into a wood tie with the resilient leg engaging a rail flange. The dotted lines illustrate the position of the fastener when the leg first touches the rail flange.

Fig. 6 is an enlarged front elevation of the shank of the fastener showing the rib formed therein.

Fig. 7 is a vertical section taken along the lines 7—7 of Fig. 6.

Referring principally to Fig. 1 of the drawing, the fastener is formed from a strip of metal which is preferably wider than it is thick. The fastener consists of a substantially straight shank portion 10, the lower end of which may be pointed as indicated at 11. The length of this shank depends upon the use to which it is applied. When used as a rail spike the proportions indicated on the drawing may be found suitable, but if it is to be employed in the fabrication of a structure such as a building it may be necessary to lengthen the shank to engage a member thicker than a rail flange. The longer the shank the more readily it may flex. However the shank may pass through a hole in the member it is securing in the same manner that it extends through a tie plate. If this member is of considerable depth the clearance hole will prevent it from buckling.

The head 12 of the fastener is formed by bending the upper end of the strip laterally toward the back of the fastener, producing a helical and substantially semi-circular arc 13 in the metal. The end of the strip forms a leg 14 that curves downwardly and extends forwardly to one side of the shank, completing a closed loop and terminates in a toe 15. The shank joins the arc 13 at a tangential point indicated at 16. The other end of the semi-circular arc terminates 20 approximately at the point 17, which is preferably below the horizontal diameter of the arc. From the point 17 to the point 18 the leg may be spiral in shape. It may be desirable to have the leg 14 continue along this spiral curve to the toe 15 as indicaed in Fig. 1 or to produce the straight section 19 as illustrated in Fig. 4. The exact formation of the leg 14 is not sufficiently critical to prevent it being used for general application, but one form of the leg may be more readily adaptable for one use than it will for another.

The loop being formed in this manner does not produce an abrupt change in the stock and when pressure is exerted on the outer end of the leg flexure occurs at each increment along the loop forming the head. This produces a distribution of the bending forces throughout the entire length of this resilient section. Again the head is relatively small and compact but provides the necessary resiliency without hindering the driving qualities of the fastener. Thus the load per unit deflection of the resilient head is small, permitting wide variation in the depth to which the fasteners are driven without exceeding the yield point of the metal. This construction thus furnishes a factor of safety which is essential in installation where the object fastened is subjected to vibration. The loop of the head closes, rather than stressing the fibers beyond their elastic limit which would produce a permanent set in the metal and deform the resilient section.

The load characteristics of these fasteners may be varied to suit different applications without impairing the design. The cross sectional area of the stock may be increased to provide greater clamping pressure. The diameter of the loop may be changed to produce a different load per unit of deflection and the leg length together with its initial angular relation may be adjusted to produce variations in the load characteristics. Obviously the load of any one fastener may be varied by driving it to different depths in the anchoring member.

The toe 15 is formed by bending up a small portion of the end of the leg 14. The bottom of this bend may form the bearing engaging surface through which the retaining forces are transmitted. In order that the bottom of the bend may be in engagement along its full length the line of this bend must be parallel to the plane of the shank which is also parallel to the axis of the semi-circular arc. However the leg 14 may be bent diagonally across its width at the point 18 as illustrated in Fig. 1, thereby providing a greater contact engagement area. In this instance the transverse bend forming the toe 15 may be made at ninety degrees to the edge of the material as shown. Again the end of the leg may be shaped to fit the contour of the fastened object where the application requires this expediency. Thus the twist may be made through 90° to produce a rigid leg, the greatest dimension of which is disposed in a vertical plane requiring the total flexure to be assumed by the loop of the head.

The exact position of the twist at the point 18 along the leg 14 is preferably in the vicinity of the shank. This will provide a sufficient bearing engaging surface for most applications of the fastener. The same effect may be produced by gradually twisting the material throughout the full length of the loop. This may be accomplished by the action of the forming die.

The impact receiving surface 20 is on the top of the arcuate loop. This surface is not directly above the axial center of the shank but it is closely adjacent thereto. The section between the top 20 of the loop and the point 16 is relatively short, thereby providing very little resiliency to interfere with the driving of the fastener. As soon as the toe engages the object to be clamped it ceases to vibrate and the fastener is as readily driven as any ordinary spike.

The arc 13 of the loop of the fastener shown in Fig. 2 is not helically formed, since the leg 14 is bifurcated from the point 21 and the two sections straddle the shank 10 as shown. The leg 14 may be bifurcated by removing some of the material in the middle of the strip or it may be cut and the two sections spread apart by the forming die.

The fastener illustrated in Fig. 3 is similar to that shown in Fig. 2 in that the resilient leg 14 passes to one side of the shank 10. The loop 22 of the head of this fastener follows a spiral curve from the tangential point 16 and the material is gradually twisted from the true helix so that the full width of the under surface of the leg 14 engages the object to be secured.

The stock of the material forming the head is tapered so that it becomes gradually thinner as it progresses to the toe. The taper may start at any desired point between the limits of the points 16 and 20. With this construction the thickness of the stock at any point in the arm or loop varies in direct proportion to the distance between the point and the toe of the leg. Thus the thickness of the stock at any one point is proportional to the bending movement at that point. This provides equal flexing for all points along the leg and loop, thereby distributing the strain equally in proportion of the stress throughout the entire spring section. This differs from the other forms not having a tapered head in that the gradation of the flexure may not be uniform throughout the leg and loop. However the distribution of the bending forces throughout these heads prevents a point of maximum bending moment and stress concentration.

If the loop of the head in Fig. 1 is flattened against the shank and the arm extended forwardly and downwardly the fastener appears as shown in Fig. 4. The bending moments in this structure would be concentrated in the vicinity of the junction of the loop and the leg as indicated at 23. Such a structure is not preferable but the leg is resilient and the impact receiving surface 20 is substantially in alinement with the axis of the shank, which permits the fastener to be driven into relatively hard wood without a socket or lead hole.

The loop of the fastener shown in Fig. 5 is formed spirally from the tangential point 16 to the point 18. The portion 19 of the leg which extends from the point 18 to the toe 15 is substantially straight. The material forming the loop is twisted gradually from the true helix in the same manner as that described in Fig. 3 so that the full width of the under surface of the portion 19 may be in flat engagement with the object to be secured. The object to be secured is the foot or flange 24 of a rail. 25 represents a tie plate which is provided with the hole 26 for receiving the shank 10. 27 represents the tie. The tie is provided with the lead hole 28 for the shank of the spike.

The flexure of the fastener shown in Fig. 5 is distributed principally throughout the loop and very little is assumed by the straight section 19 of the leg. When the fastener is driven to the proper depth this straight flat surface engages the upper inclined surface of the rail flange. In this position the compression forces created by flexing and partially closing the loop represent the proper load application for this design of fastener. In other words, the straight section 19 of the leg acts as a gauge in determining the depth the fastener should be driven to obtain the proper amount of resilient pressure for holding the rail in place. When the under flat surface of the leg comes into engagement for the full length of its overlap the fastener is properly set. If this point has not been reached the bend forming the toe 15 would be the only portion of the leg in engagement with the flange. If the fastener was driven too deep the straight portion will pivot on the outer upper edge of the flange. Thus full engagement of the straight portion 19 represents the gauge point.

To gauge the proper depth of the fasteners not having a straight section 19 in their resilient legs 14 it may be necessary to watch the closing of the loop until the leg is substantially at right angles to the shank.

In each structure the resilient head 12 is formed by a loop with a forwardly extending leg. These loops may be semi-circular, spiral or closed. The impact receiving surface 20 of the semi-circular shaped loops are obviously a little farther from the shank than the spirally formed loops and the impact receiving surface of the flattened loop is closely adjacent the shank. The latter is more readily driven but the open loops are relatively small in diameter and therefore present no difficulty in driving. Nor are the loops deformed by the driving force. The rigidity of the material together with the smallness of the open loop does not produce a spring reaction that is characteristic of a fastener wherein the head is formed by merely bending the strap over and downwardly or where the shank is intermediate of the sides of the loop. Structures of this character produce a violent spring reaction when being driven.

As an example, the outside dimensions of the loop shown in Fig. 1 may be approximately one and one-eighth inches and it is drawn around an arc of approximately 250° with the leg extending downwardly and forwardly of the shank at approximately 70° thereto. The leg thus flexes approximately through 20° to full load application and may create a thousand pound force when deflected approximately three-eighths of an inch. The stock is three-sixteenths of an inch thick and three-quarters of an inch wide. The shank is approximately six inches from the point 11 to the tangential point 16 and the leg extends approximately one and one-quarter inch in front of the shank. A loop of this dimension made from this size stock obviously has little or no spring reaction on a hammer when driven.

The lead hole 23, which is used for relatively hard wood, for this size shank should be approximately one-quarter of an inch in diameter. If the fastener is to be driven into a steel socket the hole therein should be similar in rectangular cross section to that of the shank and be tight enough to provide a driving fit. Again the fastener may be readily driven between the abutting surfaces of two steel channel members which are secured together with a sufficient space therebetween to permit a driving fit.

The gripping characteristics on the shank in any anchoring member do not depend upon the tightness of the hole or the driving fit, because a relatively few pounds pressure may be used to grip the shank and the fastener will apply several thousand pounds pressure at the toe.

The principal reason for this result is the fact that the load application is spaced from the shank. The load tends to lift the leg further and close the loop. This sets up a force which attempts to rotate the whole head of the fastener away from the object secured and the pivot point occurs in the shank adjacent to the point where it enters the member into which it is driven. The force tending to rotate the head is thus applied to the surfaces engaging the shank, increasing the frictional engagement therebetween. These forces naturally exceed the initial shank engaging force and are increased in proportion to the load applied. Thus the load application does not tend to lift the shank out of the hole and therefore only a few pounds pressure is all that is required initially to hold the shank in place when the fastener is applied. The advantages that this fastener provide are obvious because vibration will not loosen the shank.

In view of the characteristics of this fastener it is necessary to provide a rigid shank. First, because it is desirable to employ the lightest or thinnest stock which must be driven, and secondly, because of the tendency for the load to bend the shank. Rigidity of the shank is obtained by pressing a longitudinal rib 30 in the intermediate portion of the shank. The cross sectional shape of this rib is substantially a circular segment. The rib thus formed on one side produces the flute 31 in the other side. The depth of the flute is fixed in proportion to the width and thickness of the stock and it may vary from a slight arcuate concavity to a complete semi-circle, to give any desired rigidity to suit various applications of the fastener. It is believed that the shank having a rib of this character will bend under less pressure with the rib at the exterior of the bend than it will with the flute at the exterior. It might therefore seem logical to place the flute on the front of the fastener to counteract the pivoting force of the load. The fastener would be practical regardless of which way the rib faced, but the forces would be more apt to concentrate at one point if the flute was on the front face, and be distributed if the flute is on the rear face. Therefore the latter construction has been chosen as preferable. Again it is easier to tear a sharp edge by bending than it is a rounded edge.

Attention is directed to the ends of the rib which taper gradually into the stock of the material as indicated at 32. The other dimension of the end of the rib 30 also tapers to a rounded apex shown at 33. The formation of the ends of the rib in this manner prevents an abrupt change in section and thereby avoids concentration of stresses at these points. It also facilitates driving the fastener into the support.

In forming the rib the flute for stock three-quarters of an inch wide and three-sixteenths of an inch thick should be approximately one-eighth of an inch deep. The wider the stock the deeper the flute should be to obtain the proper rigidity.

The loop head, which is formed entirely on one side of the shank, provides a resilient structure for distributing the bending forces therearound and thus prevents the concentration of forces at a point on the shank where the load tends to pivot the upper half of the fastener. If the bite of the toe is short and a stiffened shank is not provided, the shank may bend and the head may rotate sufficiently to pull the toe off the member it is clamping.

In pointing up the spike edge end 11 of the shank it is preferable to form the edge substantially in alignment with the bottom of the flute as shown in Fig. 7.

These fasteners may be easily removed by inserting the end of a spike puller in the loop and prying it out of the anchoring member.

The rib in the shank of these fasteners may be formed in the stock by an interrupted rotary die which presses the flute at spaced intervals along the strip. The strip may then be cut into sections of proper length for producing the fastener. The shank rib may also be formed in the short sections of stock by the die which forms the loop.

The first action of the die is to grip the shank section of the stock and press the rib therein if it has not been previously formed. A movable section of the die then bends the free end of the stock down over a stationary arcuate surface which guides the stock in the form of a helix. Further movement of the die bends the free end up past the shank, thereby completing the loop. The stationary arcuate surface does not extend beyond the edge of the shank. Thus it may be retracted without engaging the formed loop when the die opens. The contour of the stationary arcuate surface of the die determines the shape of the loop and the leg.

After the fastener has been formed it is then heat treated. The actual shape of the fastener together with the heat treatment permits full advantage of the physical properties of the steel, thereby reducing the amount of steel required to a minimum and still obtaining the desired results. The small cross section of the stock promotes accurate control and strict uniformity in the heat treating process, which is not obtainable in fasteners of heavy cross section which have cores of lower tensile strength due to the lack of hardness penetration.

I claim:

1. A resilient fastener consisting of a strip of flat metal of materially greater width than thickness, and comprising a straight shank, a stiffening rib extending longitudinally of the shank through the region of maximum bending, and a bent portion integral with the shank and arranged to engage the member to be fastened at a point spaced from said shank, said rib arranged to resist the bending forces produced by the off-center engagement of the member by the bent portion of the fastener.

2. A resilient fastener consisting of a strip of flat metal of materially greater width than thickness, and comprising a straight shank, a bent portion integral with the shank and arranged to engage the member to be fastened at a point spaced from said shank, and a stiffening rib extending longitudinally of the shank through the region of maximum bending and adjacent the beginning of the bent portion, said rib arranged to resist the bending forces produced by the off-center engagement of the member by the bent portion of the fastener.

3. A resilient fastener consisting of a strip of flat metal of materially greater width than thickness, and comprising a straight shank, a bent portion integral with the shank and arranged to engage the member to be fastened at a point spaced from said shank, and a stiffening rib extending longitudinally of the shank through the region of maximum bending and tapering into the original cross sectional shape of the strip, said rib arranged to resist the bending forces produced by the off-center engagement of the member by the bent portion of the fastener.

KENNETH L. JOHNSON.